US006957431B2

(12) United States Patent
Bollella et al.

(10) Patent No.: US 6,957,431 B2
(45) Date of Patent: Oct. 18, 2005

(54) SYSTEM FOR INCREMENTALLY COMPUTING THE MAXIMUM COST EXTENSION ALLOWABLE FOR SUBSEQUENT EXECUTION OF EACH TASK USING FIXED PERCENTAGE OF THE ASSOCIATED COST

(75) Inventors: Gregory Bollella, Durham, NC (US); Peter F. Haggar, Raleigh, NC (US); James A. Mickelson, Cary, NC (US); David M. Wendt, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 09/782,780

(22) Filed: Feb. 13, 2001

(65) Prior Publication Data

US 2002/0138542 A1 Sep. 26, 2002

(51) Int. Cl.[7] .................................................. G06F 9/46
(52) U.S. Cl. ...................... 718/100; 718/102; 718/104; 718/107; 718/108
(58) Field of Search ................................ 718/100, 102, 718/104, 107, 108, 103

(56) References Cited

U.S. PATENT DOCUMENTS

| | | | | | |
|---|---|---|---|---|---|
| 5,210,872 | A | * | 5/1993 | Ferguson et al. | 718/102 |
| 5,325,525 | A | * | 6/1994 | Shan et al. | 718/104 |
| 5,408,663 | A | * | 4/1995 | Miller | 718/104 |
| 5,640,563 | A | | 6/1997 | Carmon | 395/672 |
| 6,117,180 | A | * | 9/2000 | Dave et al. | 703/20 |
| 6,321,133 | B1 | * | 11/2001 | Smirnov et al. | 700/100 |
| 6,430,593 | B1 | * | 8/2002 | Lindsley | 718/103 |
| 6,463,457 | B1 | * | 10/2002 | Armentrout et al. | 709/201 |
| 6,502,062 | B1 | * | 12/2002 | Acharya et al. | 702/186 |
| 6,578,005 | B1 | * | 6/2003 | Lesaint et al. | 705/8 |
| 6,601,035 | B1 | * | 7/2003 | Panagos et al. | 705/8 |
| 6,687,257 | B1 | * | 2/2004 | Balasubramanian | 370/429 |
| 6,711,129 | B1 | * | 3/2004 | Bauer et al. | 370/230 |
| 6,721,778 | B1 | * | 4/2004 | Smith et al. | 718/103 |
| 2002/0002578 | A1 | * | 1/2002 | Yamashita | 709/105 |
| 2002/0012332 | A1 | * | 1/2002 | Tiedemann et al. | 370/335 |
| 2002/0110112 | A1 | * | 8/2002 | Tuomi | 370/352 |

FOREIGN PATENT DOCUMENTS

JP          11184717          12/1997          ............. G06F/9/46

* cited by examiner

*Primary Examiner*—Meng-Al T. An
*Assistant Examiner*—Lilian Vo
(74) *Attorney, Agent, or Firm*—Marcia L. Doubet (57) ABSTRACT

The present invention provides a method, system, and computer program product for improving scheduling of tasks in systems that accumulate execution time. An upper bound is computed on the amount of additional time each schedulable task in the system may continue to execute after exceeding its predetermined cost, without adversely affecting overall operation of the system (that is, ensuring that the continued execution will not cause invocations of subsequent tasks to fail to meet their execution deadlines). By allowing tasks to run longer, the potential that the task will successfully end is increased, thereby yielding a more efficient overall system. In the preferred embodiment, the extensions are iteratively computed as a fixed percentage of the cost of each task until reaching an amount of time where the system is no longer feasible. The extension values resulting from the iteration before the cost-extended system becomes infeasible are then used at run-time when a particular task encounters an overrun condition. This technique is advantageous in systems where execution of non-schedulable entities (such as occurrence of hardware interrupts) occurs during execution of one or more of the scheduled tasks.

9 Claims, 4 Drawing Sheets

SYSTEM FOR INCREMENTALLY COMPUTING THE MAXIMUM COST EXTENSION ALLOWABLE FOR SUBSEQUENT EXECUTION OF EACH TASK USING FIXED PERCENTAGE OF THE ASSOCIATED COST

BACKGROUND OF THE INVENTION

1. Field of the Invention

The present invention relates to a computer system, and deals more particularly with a method, system, and computer program product for improving the operation of real-time systems through optimizations in the scheduling of tasks.

2. Description of the Related Art

The tasks executed in real-time systems tend to be highly predictable in terms of their execution characteristics (which are also known as "release characteristics"). In particular the execution patterns of tasks in real-time systems that are based upon a task model referred to as the "periodic task model" are predictable in terms of two values, their period and their cost. The period of a task is an interval of time that represents the natural frequency of execution for the task. The cost for a task is also an interval of time, and represents the maximum time it takes the task to complete its required work in a single period. For example one task may execute once every five days, but only execute for 2 minutes within this five-day period; the period for this task is therefore 5 days while its cost is 2 minutes. Another task in the same system may execute once in every 10-millisecond interval, and have a cost of 10 microseconds. In the general case, each period (except the first) begins immediately at the end of the previous period. The semantically correct execution pattern is that an instance of a task becomes ready to run at the beginning of every period and must complete its work sometime before the end of the period in which it is invoked. The end of the period for a task invocation is called the deadline.

For a set of periodic tasks following the above model, it is easy to compute whether every invocation of every task will all meet their deadlines. The equation $$\sum_{I=1}^{N} \frac{C_I}{T_I} \leq N(2^{1/N} - 1)$$

may be used to make this determination (referred to hereinafter as a feasibility determination), where C(I) is the execution cost of task I and T(I) is the period of task I (where uniform time units over all I=1 . . . N are used) and where priority among tasks is assigned according to the well-known rate-monotonic priority assignment ("RMA") algorithm. (Briefly stated, tasks with shorter periods get higher priorities when using the RMA approach). Techniques for evaluating the feasibility of systems in this manner to determine whether all deadlines will be met are known in the art.

In most real-time systems, however, there are additional entities that may execute, in addition to the expected (schedulable) tasks, but which cannot be accounted for in the scheduling process or in the feasibility determination process just described. These entities are referred to herein as "non-schedulable entities" ("NSEs"). NSEs require computation time, and are generally necessary for operation of a typical system. An example of an NSE is a hardware interrupt event. In general, there is no way to predict when (or whether) a hardware interrupt or other similar NSEs will occur. NSEs are therefore typically invisible to feasibility and scheduling algorithms.

However, the computation time required when an NSE does execute may cause tasks to miss their deadlines, even though those tasks are dispatched according to a schedule shown to be feasible by the feasibility algorithm. The reason for this is that the system may execute some NSEs (such as hardware interrupts) in preference to the scheduled tasks. Since the NSEs are invisible to the feasibility algorithm, the scheduling process will tend to incorrectly assign the execution time of any NSEs that execute during the execution of a scheduled task to that scheduled task. For example, if the cost of a particular task is 20 arbitrary time units (ATUs), the system will expect that task to be finished after executing for 20 ATUs. If the task is not finished at that time, which will be the case if NSEs have executed during the 20 ATUs, the system will typically generate an error condition and the task will fail.

It should be noted that there are a few real-time systems that can distinguish between the execution of an NSE and the execution of a scheduled task. Examples include Real-time Mach and Linux/RT. However, these systems typically do not include NSEs in the feasibility algorithm. (For various theoretical reasons, ignoring NSEs in the feasibility computations is a reasonable approach: in many cases, NSEs may account for a very small fraction of the overall execution time, and thus the feasibility of the system is not adversely affected by NSEs. However, this requires that the NSEs are known to be independent from one another, and therefore do not have a cumulative effect. This assumption does not always hold. When NSEs disable interrupts, for example, the dispatcher or scheduler may not be able to access the processor sufficiently often to ensure that the system is not affected.)

As will be obvious, when a task exceeds its expected execution time due to occurrence of an NSE and is thus cancelled, serious inefficiencies result. It would be preferable to avoid cancelling tasks, increasing the likelihood that the task will run to completion, as long as the feasibility of the overall system could be ensured.

U.S. Pat. No. 5,640,563, titled "Multi-Media Computer Operating System and Method", teaches a technique for scheduling tasks in real-time systems according to their deadlines (i.e. their required end times), rather than their start times, in order to reduce the processor overhead generated by the task scheduling operation. However, this patent does not teach a technique that accounts for execution in the presence of NSEs.

U.S. Pat. No. 5,408,663, titled "Computer-Implemented Method of Scheduling Tasks Constituting Project", teaches a technique for optimizing project scheduling where the overall effects of task duration (including the total duration of the project or the project's cost) are unsatisfactory. Resources to be assigned to the tasks for the project are iteratively adjusted to see if the project duration can be shortened. This patent also does not teach a technique that accounts for execution in the presence of NSEs, and in particular, does not teach a technique for allowing tasks to continue executing for longer time intervals.

Accordingly, what is needed is an improved technique for scheduling tasks that avoids the problems of the prior art.

SUMMARY OF THE INVENTION

An object of the present invention is to provide an improved technique for scheduling tasks.

Another object of the present invention is to provide a technique that avoids cancellation of executing tasks that exceed their expected execution time.

Another object of the present invention is to provide this technique while ensuring that the overall system remains feasible.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for improving task scheduling. This technique comprises: computing whether execution of a plurality of tasks is feasible, wherein each of the tasks has an associated cost and an associated deadline; adding an additional amount of time to the associated cost for each of the tasks, thereby yielding a revised cost for each task, when the execution is computed to be feasible; and iteratively repeating operation of the computation and the addition, until the execution is computed to be no longer feasible. The technique may further comprise using the revised cost for each task as an upper limit on execution time for the task, after operation of the iterative repeating.

In one aspect, the additional amount of time is a fixed percentage of the associated cost for the task. In another aspect, the additional amount of time is zero for a subset of the tasks, and for all other tasks is a fixed percentage of the associated cost for the task. In yet another aspect, on a first iteration of the addition, the additional amount of time is a fixed percentage of the associated cost for the task and on other iterations, the additional amount of time is a fixed percentage of the revised cost for the task. In a further aspect, on a first iteration of the addition, the additional amount of time is zero for a subset of the tasks, and for all other tasks is a fixed percentage of the associated cost for the task, and on other iterations, the additional amount of time is a fixed percentage of the revised cost for the task.

Using the revised cost may further comprise determining, at run-time, whether a particular one of the tasks has exceeded its associated cost, and if so, allowing the particular task to run until reaching a minimum of (1) an amount of time remaining until the task's associated deadline or (2) the upper limit on execution time for the task.

The present invention will now be described with reference to the following drawings, in which like reference numbers denote the same element throughout.

DESCRIPTION OF THE PREFERRED EMBODIMENTS

Figure 1:
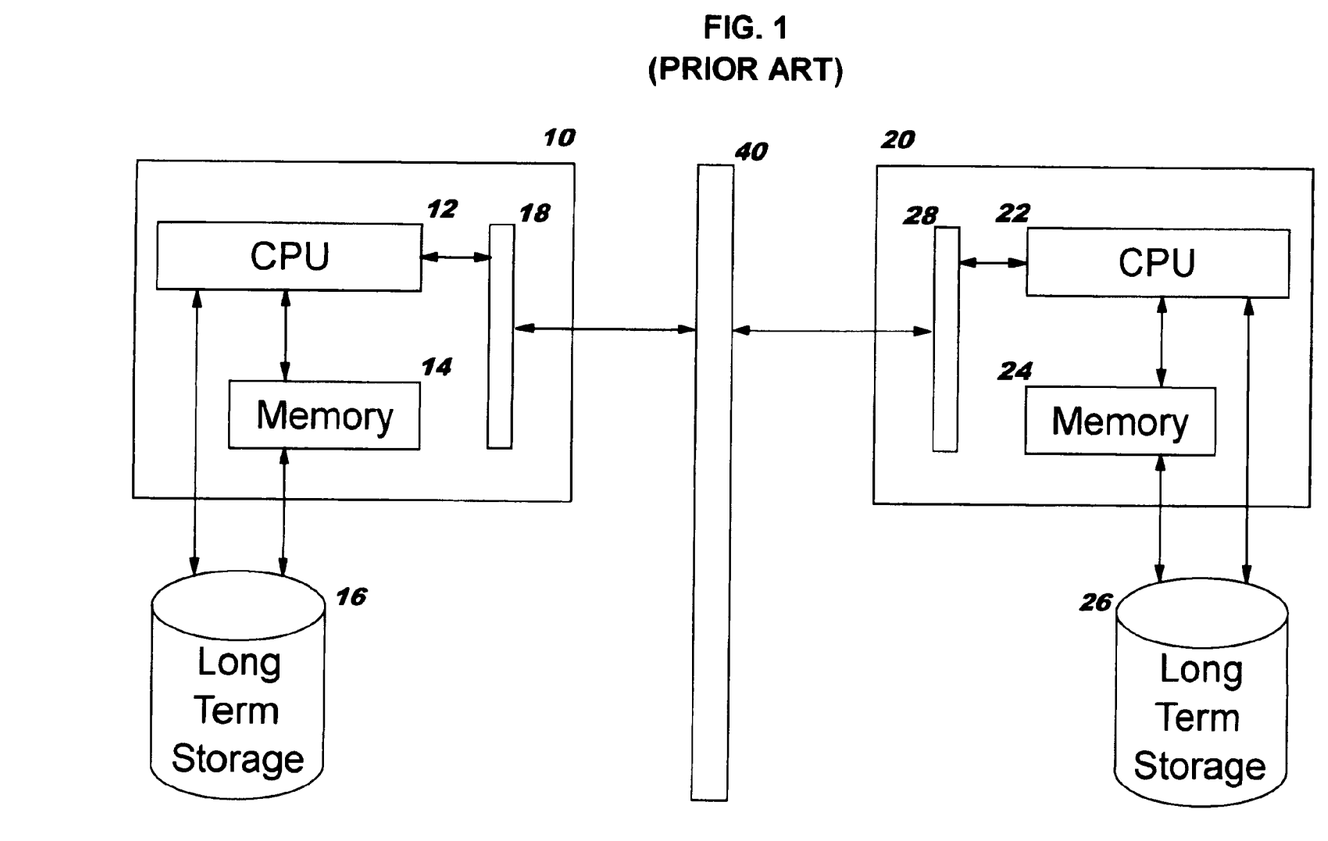
FIG. 1 is a block diagram illustrating computing devices in which the present invention may be practiced.

FIG. 1 illustrates representative computing devices in which the present invention may be practiced. Computing device 10 is preferably a standard computing device of the type that is commercially available, and comprises a central processing unit (CPU) 12, memory 14 (which may be primary and/or secondary memory), long-term storage 16 (which can include one or more of a hard drive, diskette drive, tape drive, etc.), and (optionally) network transmission capability 18. Computer program instructions that implement the present invention are preferably stored in the memory 14 (and/or in storage 16).

Computing device 10 may be a server or mainframe, a single-user workstation, or any other type of computing device. In typical uses of the present invention, a system of real-time tasks is executing on device 10.

In some systems with which the present invention is used, an application executing on a first computing device 10 will exchange information with an application executing on a second computing device 20. A transmission between machines typically occurs using a network 40. In an alternative configuration (not shown in FIG. 1), the exchanged information may be transmitted from one process to another within a single machine, or may be transmitted between machines in alternative manners (including direct attachment to a communications channel).

As described for computing device 10, computing device 20 is preferably a standard, commercially-available computing device, and also comprises a CPU 22, memory 24 (which may be primary and/or secondary memory), one or more types of long-term storage 26, and network transmission capability 28. Alternatively, computing device 20 may use ROM memory 24 and not contain long-term storage 26.

Network 40 may be a local area network (LAN) or a wide area network (WAN), or computing devices 10 and 20 may operate in a client/server or peer-to-peer network, or any other type of networking configuration may be used. Such configurations, as well as the appropriate communications hardware and software, are known in the art.

Figure 2:
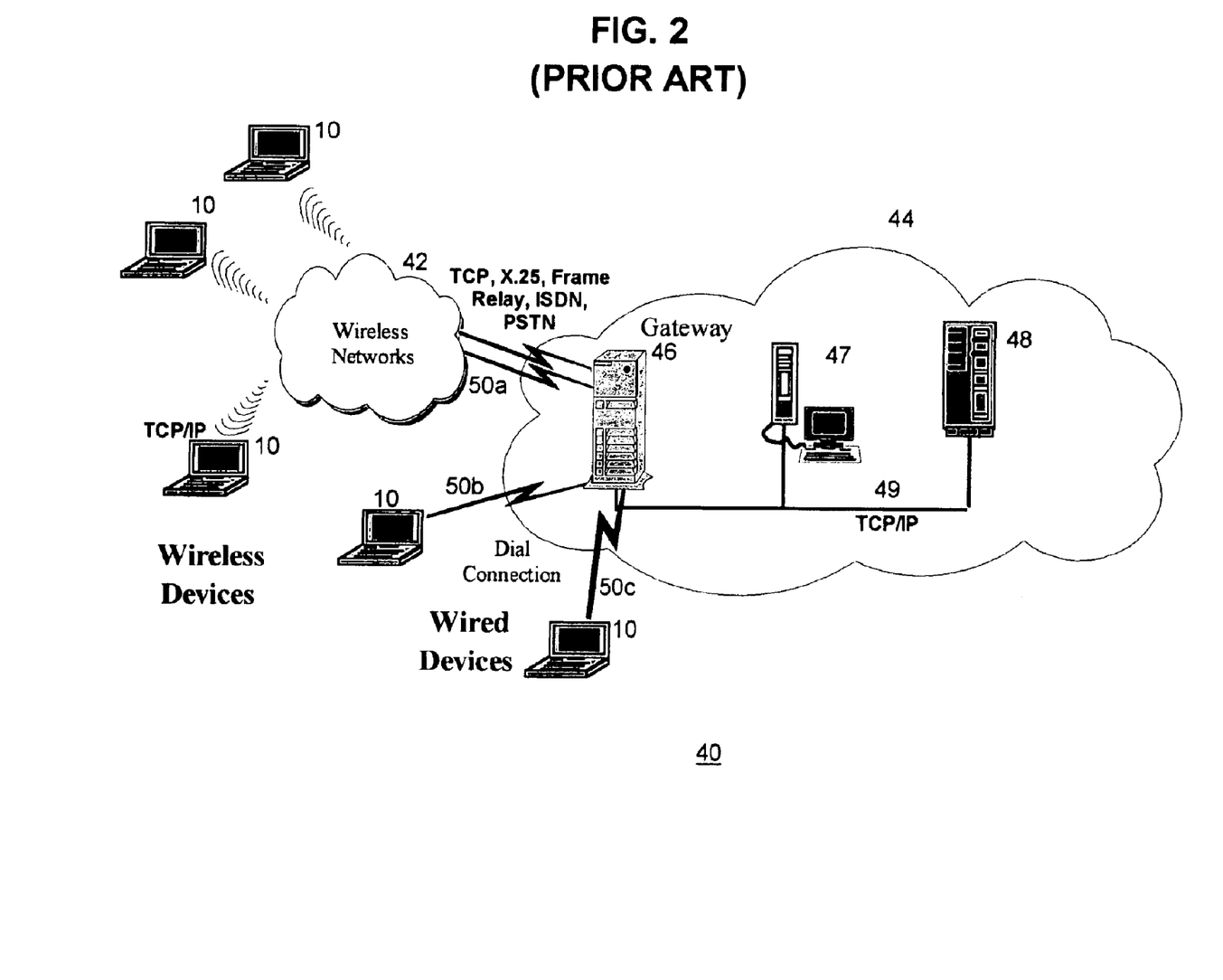
FIG. 2 is a diagram of a networked computing environment in which the present invention may be practiced.

FIG. 2 illustrates an example network configuration 40 in which the present invention may be practiced. The network 40 may include a plurality of individual networks, such as wireless network 42 and network 44, each of which may include a plurality of individual computing devices of the type described with reference to FIG. 1. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more wired or wireless devices 10 using a communications link 50b, 50c. The gateway computer 46 may be implemented utilizing an Enterprise Systems Architecture/370 available from the International Business Machines Corporation (IBM), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more devices 10.

Those skilled in the art will appreciate that the gateway computer 46 may be located a great geographic distance from the network 42, and similarly, the devices 10 may be located a substantial distance from the networks 42 and 44. For example, the network 42 may be located in California, while the gateway 46 may be located in Texas, and one or more of the devices 10 may be located in New York. The devices 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The devices 10 may alternatively connect directly to the gateway 46 using dial connections 50b or 50c. Further, the wireless network 42 and network 44 may connect to one or more other networks (not shown), in an analogous manner to that depicted in FIG. 2.

In the preferred embodiment, the present invention is implemented in computer software. Alternatively, the present invention may be embodied in hardware, or in a combination of software and hardware. In a software embodiment, as depicted in FIG. 2, software programming code which embodies the present invention is typically retrieved by the CPU 12 from long-term storage media 16 of some type, such as a CD-ROM drive or hard drive, and loaded into memory 14. (Alternatively, some or all of the software programming code may be retrieved directly from ROM memory 14.) The software programming code may be embodied on any of a variety of known media for use with a computing system, such as a diskette, hard drive, or CD-ROM. The code may be distributed on such media, or may be distributed from the memory or storage of one computing device over a network of some type to other computing devices for use by such other devices. Alternatively, the programming code may be accessed directly from long-term storage 16. The techniques and methods for embodying software programming code in memory, on physical media, and/or distributing software code via networks are well known and will not be further discussed herein.

Note that while the discussions herein are in terms of a real-time system, this is for purposes of illustration and not of limitation. Other scenarios in which a set of predictable tasks are scheduled according to their execution time are also within the scope of the present invention.

The present invention defines an improved technique for scheduling tasks that avoids cancellation of executing tasks that exceed their expected execution time (i.e. their cost), while ensuring that the overall system remains feasible. In particular, in a system of periodic tasks using RMA assignment and which has a utilization less than $N*(2**(1/N)-1)$, the present invention defines a technique for allowing invocations of tasks to execute longer than their cost parameter. Although the cost parameter is a theoretical maximum execution time for the task per period, and thus should never be exceeded, the present invention uses a calculated cost extension that provides advantages in the presence of NSEs.

As an example, suppose that the cost of an invocation of some task, "Task 1", is 10 arbitrary time units (ATUs), and that the period of Task 1 is 100 ATUs. Further suppose that during the execution of Task 1 one or more NSEs execute for a total time of 1 ATU, and that the scheduler does not separately account for this NSE time but instead assigns it to the execution of Task 1. Then when the scheduler has accumulated 10 ATUs for Task 1, Task 1 will actually have executed for only 9 ATUs, and thus its work may not be complete. Many prior art systems are not able to recognize that Task 1 has reached its cost parameter, and thus do nothing. In these systems, Task 1 continues to execute until it completes. (These systems are known as "run-to-block" systems.) If all such long-running tasks are allowed to continue running unchecked, however, the feasibility of the overall system is jeopardized. The present invention is directed toward those systems which do recognize that Task 1 has reached its cost parameter. Such systems are referred to herein as "execution time accumulating systems". Using the techniques of the present invention, a dynamic run-time decision can be made as to whether allowing a long-running task to continue executing will cause other tasks to miss their deadlines. Furthermore, the techniques of the present invention provide for determining how much extra time can be given to a particular long-running task while still ensuring that all other tasks will complete on time.

The preferred embodiment of the present invention will now be described in more detail with reference to FIGS. 3 and 4.

Figure 3:
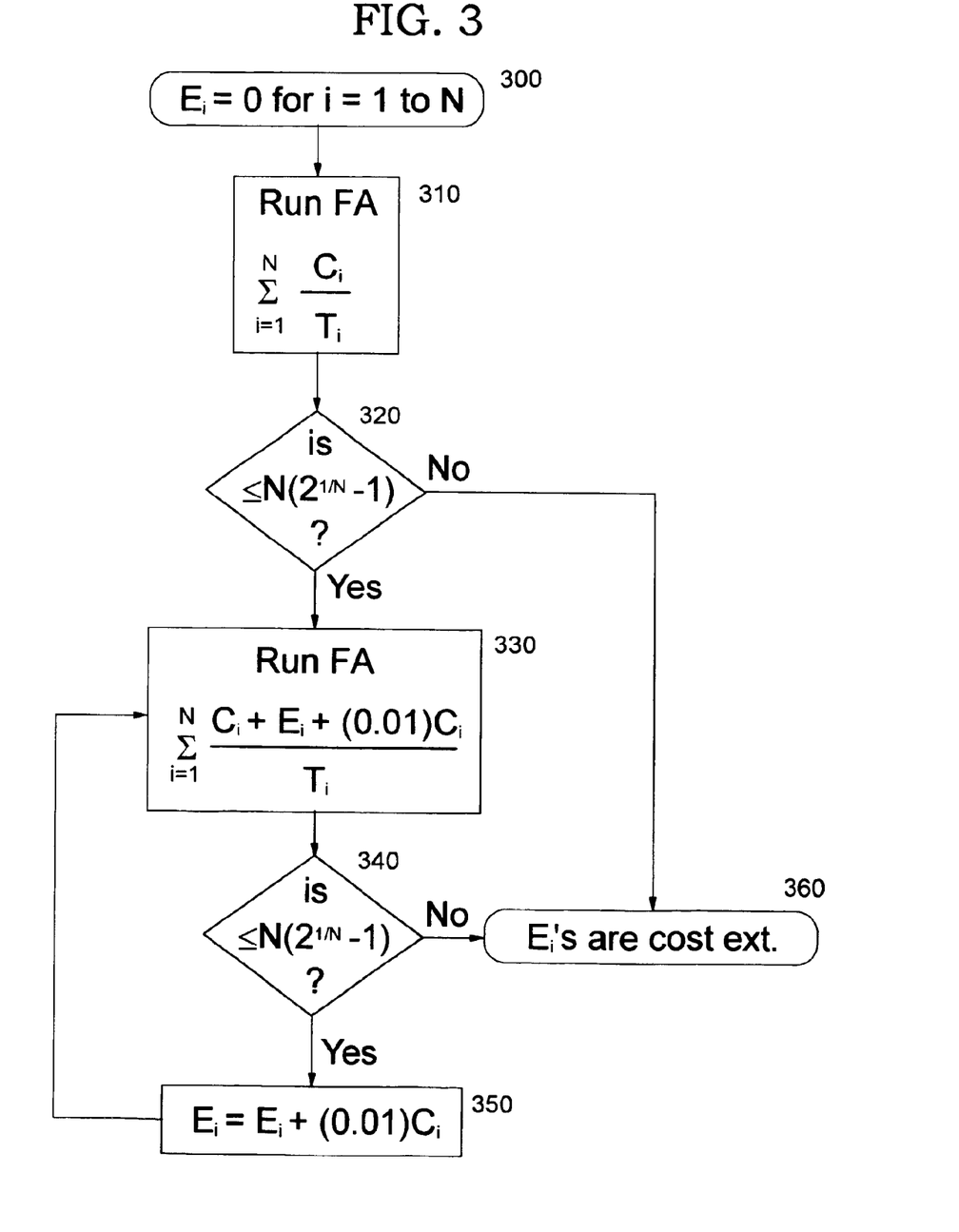
FIG. 3 provides a flowchart of a preferred embodiment of the logic that may be used to implement the improved feasibility algorithm of the present invention.

Using the logic shown in FIG. 3, an upper bound on the amount of additional time tasks can safely execute is computed. This additional time is referred to herein as a "cost extension". This upper bound is computed incrementally, until reaching a value where the feasibility of the system cannot be ensured. In the preferred embodiment, a cost extension is computed for each task by incrementally adding a fixed percentage of the task's cost. In the preferred embodiment, this fixed percentage is 1 percent of the task's cost parameter.

The logic of FIG. 3 begins at Block 300 by initializing each of(1 to N) cost extension values (referred to in FIG. 3 as $E_4$), where N is the number of schedulable tasks in the system, to zero. Each schedulable task preferably has a state variable space where its cost extension period, and deadline values are stored. An additional value is stored in this state space for the task's cost extension when using the present invention.

At Block 310, a feasibility analysis computation is performed by summing the cost of each task divided by its period. Block 320 then compares this sum to the expression that is used (in prior art systems) to determine whether every invocation of every task will meet its deadline. If the test in Block 320 has a negative result, then the system is not feasible, and control transfers to Block 360. Upon reaching Block 360 from a first iteration of the logic in FIG. 3, the cost extension values to be used are all zero, so that the system will operate as in the prior art.

When the test in Block 320 has a positive result (i.e. the system is feasible), processing continues to Block 330. In Block 330, a fixed percentage of each task's cost is computed. When this fixed percentage is 1 percent, the expression $(0.01) C_i$ determines the additional amount of time to be added for this iteration. This amount is added to the previously-computed cost extension for the task in $E_i$, and the result is added to the task's cost parameter in $C_i$. The resulting sum is then divided by the task's period. This process is repeated for each of the 1 to N schedulable tasks to determine a new feasibility analysis value for the system, after which Block 340 compares the result to the utilization expression used to determine whether every invocation of every task will meet its deadline. If this test has a positive result, then at Block 350 another incremental extension is made to the cost for each of the (1 to N) tasks, and control returns to Block 330 to repeat the feasibility analysis computation. Otherwise, when the test in Block 340 has a negative result (i.e the system is no longer feasible after the current computation of cost extensions), then control transfers to Block 360. As shown at Block 360, the upper bound on the extension for each task has been found and is stored in $E_i$ (assuming that each task uses the same fixed percentage in each iterative extension computation). The processing of FIG. 3 is then complete.

In an alternative embodiment of the logic shown in FIG. 3, other fixed percentage values may be used. In another alternative embodiment, cost extensions may be computed for some tasks but not for others. For example, long-running tasks might be allowed to extend while other shorter tasks are not (based on the rationale that the long-running tasks are more expensive in terms of system resources if they fail to complete). In this case, the extension for the tasks in the latter case is considered to be zero. In yet another alternative embodiment, non-uniform extension amounts may be used during the incremental computation process. As an example of using this approach, longer-running tasks may be allotted larger cost extensions than shorter tasks, such as using 2 percent for the longer tasks and 1 percent for the shorter tasks. Or, in another embodiment, the additional amount of time computed in each iteration might be based upon the just-computed task extension, rather than on the base cost of the task (as has been shown in Block 330), such that longer-running tasks are extended using a geometric progression. It will be obvious to one of ordinary skill in the art how the logic shown in FIG. 3 may be changed to account for these alternative embodiments.

Figure 4:
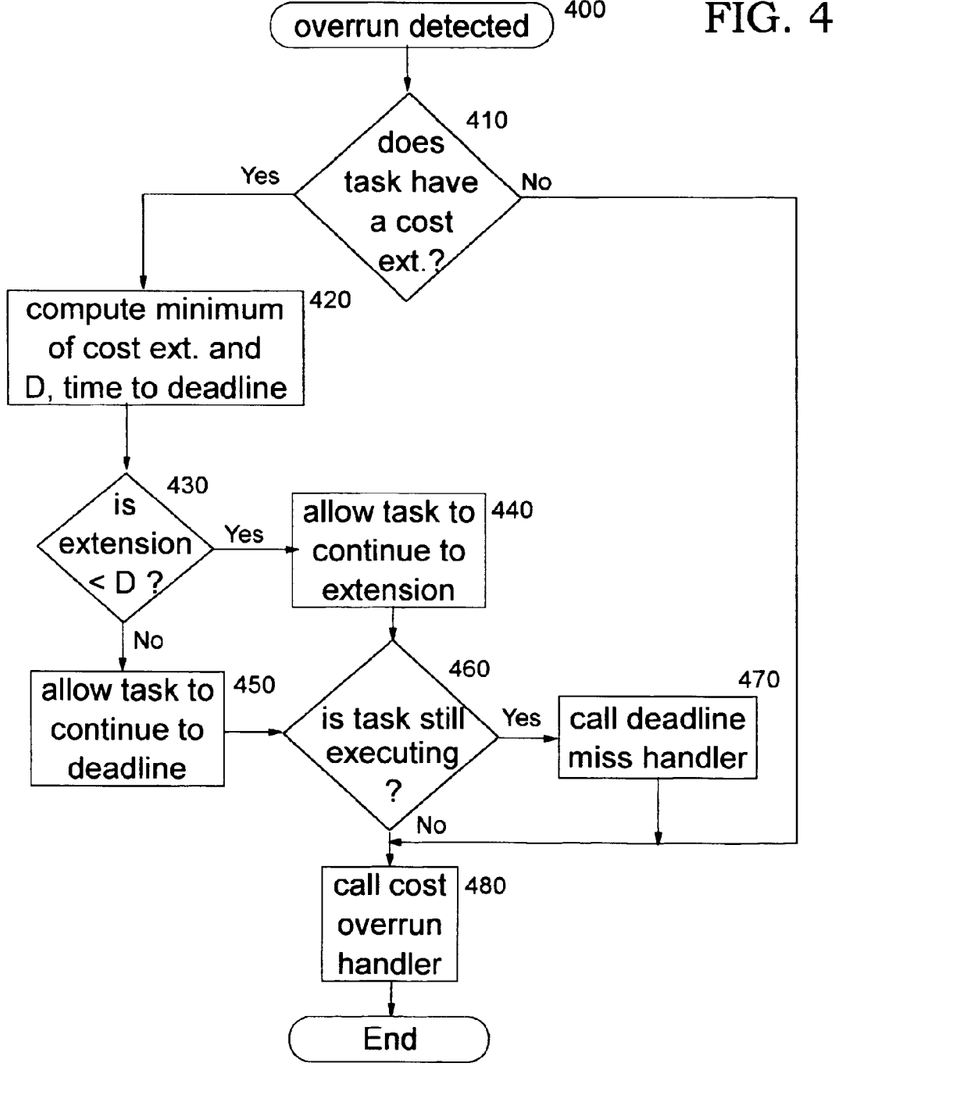
FIG. 4 provides a flowchart of a preferred embodiment of the logic that may be used at run-time to monitor task execution, according to the present invention.

The logic in FIG. 4 is used at run-time to determine whether a task that exceeds its cost parameter during its invocation in a particular period can safely continue to execute, and for how long. Knowing the cost extension for each task enables the scheduler to make this determination without affecting the execution of other tasks. In this manner, real-time systems are able to remain in their normal state (i.e. with all tasks meeting their deadlines) in the presence of NSEs for longer intervals—thus potentially allowing a task to run to completion even though the NSE has consumed some of the task's execution interval—than in prior art system that do not use the teachings of the present invention. The cost extension is allowed by detecting that a cost overrun has occurred (and thus the present invention is not deemed useful to run-to-block systems which do not accumulate execution time for tasks). The manner in which a cost overrun is processed when using the preferred embodiment of the present invention will now be described with reference to the logic in FIG. 4.

When a cost overrun for an executing task is detected, control reaches Block 400. The test in Block 410 then asks whether this task has a cost extension value (which has, for example, been stored in its state space during the processing of FIG. 3). If not, then the task's execution cannot be extended and normal cost overrun processing is invoked as in the prior art by transferring control to Block 480. Upon completion of the overrun processing, this invocation of FIG. 4 is complete.

When the test in Block 410 has a positive result, processing continues at Block 420 where the minimum of the cost extension ($E_i$) and the time remaining until this task's deadline (referred to in FIG. 4 as "D") is determined. Block 430 checks to see if the extension is the lesser value. If so, then at Block 440 the task is allowed to continue executing for the length of its cost extension. As stated with reference to FIG. 3, the extension is an upper bound on the length of time that this task can continue to execute without adversely impacting other schedulable tasks. After the task has continued to execute for this additional length of time, control reaches Block 460 which checks to see if the task is still executing. If so, then the deadline for the task has been missed (i.e. it cannot be guaranteed that this task will run to completion in the system without affecting other tasks), so a deadline miss handler is invoked at Block 470. After the deadline miss handler completes its processing (using prior art techniques that do not form part of the present invention), the cost overrun handler is invoked (Block 480). Logic may be added to the cost overrun processing, if desired, to account for situations in which tasks that have cost extensions according to the present invention still overrun their cost. For example, statistics may be gathered about those extended-cost tasks that fail to complete within the time of the extension. The processing of FIG. 4 then ends for this task.

When the test in Block 460 has a negative result, then the task has been able to run to completion during the interval of its extended cost. In the preferred embodiment, the cost overrun handler is invoked at Block 480, and the logic of FIG. 4 then ends for this task.

Returning now to Block 430, when the time remaining until the current task's deadline is greater than (or equal to) the task's cost extension, then Block 450 allows the task to continue executing until reaching its deadline. Block 460 then checks to see if the task has encountered another overrun situation (i.e. the task reached its deadline but did not complete). If so, then the missed deadline handler is invoked, as described above with reference to Block 470. After this processing, and in the case where the task met its deadline and Block 460 therefore has a negative result, the cost overrun handler is invoked, as described above for Block 480. The processing of FIG. 4 then ends.

As has been demonstrated, the present invention provides a very efficient technique for safely extending execution time of tasks that overrun their cost estimates in execution time accumulating systems, while not adversely affecting the execution of other tasks in the overall system. This technique is expected to be beneficial in a number of environments in which complex schedulers are used, including those in which the Real-Time Specification for Java™ is used for implementing real-time systems. ("Java" is a trademark of Sun Microsystems, Inc.) Use of the present invention provides more flexibility in execution environments which have task deadlines, making such systems easier to design and manage and more efficient to operate.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A computer program product for improving scheduling of tasks, the computer program product embodied on one or more computer readable media for execution on a computer and comprising:

computer-readable program code for computing whether execution of a plurality of schedulable tasks is feasible, wherein each of the tasks has an associated cost and an associated deadline;

computer-readable program code for computing a task-specific maximum cost extension allowable for a subsequent execution of each task, wherein the maximum cost extensions for all the tasks, when taken together, allow the execution of the plurality of tasks to remain feasible and wherein the maximum cost extension allowable for each task is computed incrementally by using, for a first subsequent execution, a fixed percentage of the associated cost for the task to compute a revised cost and by using, for other subsequent executions, a fixed percentage of the revised cost for the task; and computer-readable program code for using, upon determining that any of the schedulable tasks exceeds its associated cost during its subsequent execution, the maximum cost extension for that task as an upper limit on additional allowable execution time for the task.

2. The computer program product according to claim 1, wherein zero is used instead of the fixed percentage when computing the maximum cost extension, for a subset of the tasks, for the first subsequent execution.

3. The computer program product according to claim 1, wherein the computer-readable program code for using further comprises: computer-readable program code for alternatively using an amount of time remaining until the task's associated deadline as the upper limit on additional allowable execution time, when the time remaining is not greater than the maximum cost extension for the task.

4. A system for improving scheduling of tasks, comprising:

at least one processor;

means for computing whether execution of a plurality of schedulable tasks by the at least one processor is feasible, wherein each of the tasks has an associated cost and an associated deadline;

means for computing a task-specific maximum cost extension allowable for a subsequent execution of each task, wherein the maximum cost extensions for all the tasks, when taken together, allow the execution of the plurality of tasks to remain feasible and wherein the maximum cost extension allowable for each task is computed incrementally by using, for a first subsequent execution, a fixed percentage of the associated cost for the task to compute a revised cost and by using, for other subsequent executions, a fixed percentage of the revised cost for the task; and means for using, upon determining that any of the schedulable tasks exceeds its associated cost during its subsequent execution, the maximum cost extension for that task as an upper limit on additional allowable execution time for the task.

5. The system according to claim 4, wherein zero is used instead of the fixed percentage when computing the maximum cost extension, for a subset of the tasks, for the first subsequent execution.

6. The system according to claim 4, wherein the means for using further comprises:

means for alternatively using an amount of time remaining until the task's associated deadline as the upper limit on additional allowable execution time, when the time remaining is not greater than the maximum cost extension for the task.

7. A computer-implemented method for improving scheduling of tasks, comprising steps of:

computing whether execution of a plurality of schedulable tasks is feasible, wherein each of the tasks has an associated cost and an associated deadline;

computing a task-specific maximum cost extension allowable for a subsequent execution of each task, wherein the maximum cost extensions for all the tasks, when taken together, allow the execution of the plurality of tasks to remain feasible and wherein the maximum cost extension allowable for each task is computed incrementally by using, for a first subsequent execution, a fixed percentage of the associated cost for the task to compute a revised cost and by using, for other subsequent executions, a fixed percentage of the revised cost for the task; and upon determining that any of the schedulable tasks exceeds its associated cost during its subsequent execution, using the maximum cost extension for that task as an upper limit on additional allowable execution time for the task.

8. The computer-implemented method according to claim 7, wherein zero is used instead of the fixed percentage when computing the maximum cost extension, for a subset of the tasks, for the first subsequent execution.

9. The computer-implemented method according to claim 7, wherein the using step further comprises the steps of:

alternatively using an amount of time remaining until the task's associated deadline as the upper limit on additional allowable execution time, when the time remaining is not greater than the maximum cost extension for the task.

* * * * *

UNITED STATES PATENT AND TRADEMARK OFFICE
CERTIFICATE OF CORRECTION

PATENT NO. : 6,957,431 B2
APPLICATION NO. : 09/782780
DATED : October 18, 2005
INVENTOR(S) : Bollella et al.

It is certified that error appears in the above-identified patent and that said Letters Patent is hereby corrected as shown below:

Column 6,
Line 38, change "each of(1 to N)" to -- each of (1 to N) --;
Line 39, change "as $E_4$), where" to -- as $E_i$), where --;
Line 41, change "cost extension period" to --cost, period--.

Signed and Sealed this

Fifteenth Day of August, 2006

JON W. DUDAS
*Director of the United States Patent and Trademark Office*